United States Patent
Sakamoto et al.

(10) Patent No.: US 8,634,287 B2
(45) Date of Patent: Jan. 21, 2014

(54) METHOD FOR MANUFACTURING READ-ONLY OPTICAL DISC MEDIUM AND READ-ONLY OPTICAL DISC MEDIUM

(75) Inventors: Tetsuhiro Sakamoto, Kanagawa (JP); Jun Nakano, Tokyo (JP); Takayuki Asahina, Shizuoka (JP); Etsuo Shibasaki, Tokyo (JP); Hideo Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 12/526,555

(22) PCT Filed: Dec. 8, 2008

(86) PCT No.: PCT/JP2008/072251
§ 371 (c)(1),
(2), (4) Date: Aug. 31, 2009

(87) PCT Pub. No.: WO2009/075248
PCT Pub. Date: Jun. 18, 2009

(65) Prior Publication Data
US 2010/0085864 A1      Apr. 8, 2010

(30) Foreign Application Priority Data
Dec. 11, 2007   (JP) ................................. 2007-319510

(51) Int. Cl.
*G11B 7/24* (2013.01)
(52) U.S. Cl.
USPC ..................................................... 369/275.3
(58) Field of Classification Search
None
See application file for complete search history.

(56) References Cited

U.S. PATENT DOCUMENTS

| | | | | |
|---|---|---|---|---|
| 5,402,411 | A  * | 3/1995 | Maeda et al. | 369/44.26 |
| 6,728,174 | B1 * | 4/2004 | Sako et al. | 369/47.1 |
| 2002/0150032 | A1 * | 10/2002 | Nishiuchi et al. | 369/275.3 |
| 2003/0152009 | A1 | 8/2003 | Usui et al. | |
| 2003/0161248 | A1 | 8/2003 | Ohno | |
| 2004/0052190 | A1 | 3/2004 | Sako et al. | |
| 2005/0088945 | A1 * | 4/2005 | Nishiuchi et al. | 369/94 |
| 2005/0243691 | A1 | 11/2005 | Usui et al. | |

FOREIGN PATENT DOCUMENTS

| | | |
|---|---|---|
| EP | 2 053 602 A1 | 4/2009 |
| JP | 7-37247 | 2/1995 |
| JP | 2001 135021 | 5/2001 |
| JP | 2002-175649 | 6/2002 |

(Continued)

OTHER PUBLICATIONS

Search Report issued Dec. 3, 2010 in EP Application No. 08859501.2.

*Primary Examiner* — Adam R Giesy
(74) *Attorney, Agent, or Firm* — Oblon, Spivak, McClelland, Maier & Neustadt, L.L.P.

(57) ABSTRACT

An information signal area on an information signal recording surface is provided as pits on a mirror in accordance with modulated information data, and is covered with a metal alloy reflective film. Sections that do not include pits corresponding to the information data are provided in the information signal area, and portions of the metal alloy reflective film on the sections are formed as perforated marks corresponding to the information data. In this case, the reproduction signal amplification level of a prepit signal and the reproduction signal amplitude level of a perforated mark signal can be obtained as substantially equal values by adjusting the depth and width of pits and/or adjusting the width and length of perforated marks. Hence, waveform distortion due to a waveform equalization circuit and variations in binary signals due to displacement of the slice level are reduced so that signals can be stably and reliably detected with the same reading apparatus.

15 Claims, 11 Drawing Sheets

(56) References Cited

FOREIGN PATENT DOCUMENTS

| JP | 2002 175649 | 6/2002 |
| JP | 2003 22576 | 1/2003 |
| JP | 2003-22576 | 1/2003 |
| JP | 2003-123299 | 4/2003 |
| JP | 2003 141821 | 5/2003 |
| JP | 2003-141821 | 5/2003 |
| JP | 2003-248930 | 9/2003 |
| JP | 2003 248930 | 9/2003 |
| JP | 2005-216365 | 8/2005 |
| JP | 2005 216365 | 8/2005 |
| WO | 01 08145 | 2/2001 |
| WO | 02 101733 | 12/2002 |

\* cited by examiner (a)

(b)

(a)

(b)

(a)

(b)

(a)

(b)

METHOD FOR MANUFACTURING READ-ONLY OPTICAL DISC MEDIUM AND READ-ONLY OPTICAL DISC MEDIUM

TECHNICAL FIELD

The present invention relates to a read-only optical disc medium, and a manufacturing method therefor. More specifically, the present invention relates to a technique that allows unique information or the like to be separately added to read-only optical disc media mass-produced by pit transfer.

BACKGROUND ART

Patent Document 1: Japanese Unexamined Patent Application Publication No. 2001-135021
Patent Document 2: International Publication Pamphlet No. 01/008145
Patent Document 3: International Publication Pamphlet No. 02/101733

For example, in read-only, that is, ROM (Read Only Memory) type optical disc media such as a CD (Compact Disc), a DVD (Digital Versatile Disc), a BD (Blu-ray disc: trademark), and a HD-DVD (High Definition DVD), music, pictures, games, application programs, and other information data are recorded in an area called a content area in a predetermined recording modulation method.

For example, many content holders use these read-only optical disc media as means for providing contents because of low production cost due to excellent mass-productivity.

Processes for manufacturing a read-only optical disc medium, for example, a DVD, roughly include a mastering process for producing an optical disc master with a laser beam; a shaping and deposition process for producing a number of disc substrates with a stamper produced from the optical disc master and forming a film on the disc substrates; and a bonding process for bonding a pair of two optical discs having a thickness of 0.6 mm together with an adhesive having a predetermined thickness so as to form a DVD disc medium having a thickness of 1.2 mm.

A concavo-convex pattern provided on the stamper is transferred onto the disc substrates mass-produced with the stamper in the shaping and deposition process. In other words, a recording data sequence of pits and lands serving as a concavo-convex pattern is formed on a portion to be an information recording surface, and this recording data sequence forms spiral or concentric recording tracks. The concavo-convex shape of the information recording surface on which pits and lands are provided is covered with a metal alloy reflective film.

After a disc is completed, laser light emitted from a reproduction apparatus is reflected by the pits and lands. In pit sequences, lands between pits are also called as "spaces".

DISCLOSURE OF INVENTION

It is not assumed that additional information is recorded on the read-only optical disc after manufacturing. Further, while the reflective film is provided on the information recording surface, as described above, it is not assumed that the reflective film is used as a film for recording.

However, in recent years, in order to manage read-only optical discs on which predetermined information data is recorded, there is a demand for a method of recording unique additional information, such as an identification number, on every manufactured read-only optical disc.

However, since a read-only optical disc is manufactured in the above-described manufacturing processes, it is difficult to record additional information on a read-only optical disc, which has been subjected to the shaping and deposition process and on which predetermined information data has been already recorded as pits, without any influence on the information data of the pits.

That is, it is difficult to record additional information in an information recording area (content area or the like) in which information data already exists as pits.

For this reason, most conventionally proposed methods of recording additional information, such as an identification number, on a read-only optical disc are based on the premise that recording is performed in an area other than the content area, or adopt a method in which additional information is recorded in a manner different from a recording modulation method for main signals (signals recorded with pits and lands transferred from the stamper).

However, read-only optical discs on which reading from the area other than the content area is performed, for example, additional information data has signal output or a modulation mode different from that of the main signals. Therefore, reading can be performed only with a reproduction apparatus having an exclusive reading function. This causes a situation in which additional information cannot be read by existing reproduction apparatuses, and compatibility is poor in this regard.

For example, a BCA (Burst Cutting Area) defined by the DVD-ROM standards is recorded in an area different from an information recording area and in a recording modulation method different from that for main signals. For this reason, a reproduction apparatus having an exclusive reading function is necessary.

Further, the above Patent Document 1 describes that an area different from an information recording area is selected when recording additional information.

Further, the above Patent Document 2 discloses that the difference in reflectance from the existing information recording area is used to read signals of recorded additional information. In this case, a reproduction apparatus having an exclusive reading function is necessary.

Accordingly, the present invention aims to read out information, which is additionally recorded on each disc after disc substrates having the same recording contents are produced in the above-described shaping and deposition process in a read-only optical disc medium, without necessitating a special reading apparatus. The present invention further aims to more stably and reliably carry out the reading.

A manufacturing method for a read-only optical disc medium according to the present invention includes a shaping process for forming a concavo-convex shape on an information recording surface according to a first modulation signal, and a deposition process for covering the information recording surface with a reflective film, and forms a recording track in which the concavo-convex shape is provided as a first recording data sequence formed by pits and lands. The manufacturing method includes a process for forming an additional-information recording area in which the information recording surface is flat, in the recording track in which the first recording data sequence is formed by the pits and the lands in the shaping process, and a process for forming a second recording data sequence by marks, which are formed by erasing or reducing the reflective film according to a second modulation signal, in the additional-information recording area after the deposition process. Formation of the first data sequence and formation of the second recording data sequence are performed so that the minimum level of reproduction signal amplitude in the first recording data sequence and the minimum level of reproduction signal amplitude in the second data sequence are substantially equal when laser light is applied onto the first recording data sequence and the second recording data sequence.

An information data modulation method in forming the first recording data sequence and an information data modulation method in forming the second recording data sequence are the same.

In the process for forming the second recording data sequence, the minimum level of reproduction signal amplitude in the first recording data sequence and the minimum level of reproduction signal amplitude in the second recording data sequence are adjusted to be substantially equal by adjusting the width and/or length of the marks formed by erasing or reducing the reflective film.

In the shaping process, the minimum level of reproduction signal amplitude in the first recording data sequence and the minimum level of reproduction signal amplitude in the second recording data sequence are adjusted to be substantially equal by adjusting the width and/or length of the pits.

Further, a manufacturing method for a read-only optical disc medium according to the present invention includes a shaping process and a deposition process, similarly to the above, and forms a recording track in which the concavo-convex shape is provided as a first recording data sequence formed by pits and lands. The manufacturing method includes a process for forming an additional-information recording area in which the information recording surface is flat, in the recording track in which the first recording data sequence is formed by the pits and the lands in the shaping process, and a process for forming a second recording data sequence by marks, which are formed by erasing or reducing the reflective film according to a second modulation signal, in the additional-information recording area after the deposition process. Formation of the first data sequence and formation of the second recording data sequence are performed so that the middle level of reproduction signal amplitude corresponding to the shortest pit or space in the first recording data sequence and the middle level of reproduction signal amplitude corresponding to the shortest mark or space in the second data sequence are substantially equal when laser light is applied onto the first recording data sequence and the second recording data sequence.

An information data modulation method in forming the first recording data sequence and an information data modulation method in forming the second recording data sequence are the same.

In the process for forming the second recording data sequence, the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the marks formed by erasing or reducing the reflective film.

In the shaping process, the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the pits.

Further, a manufacturing method for a read-only optical disc medium according to the present invention includes a shaping process and a deposition process, similarly to the above, and forms a recording track in which the concavo-convex shape is provided as a first recording data sequence formed by pits and lands. The manufacturing method includes a process for forming an additional-information recording area in which the information recording surface is flat, in the recording track in which the first recording data sequence is formed by the pits and the lands in the shaping process, and a process for forming a second recording data sequence by marks, which are formed by erasing or reducing the reflective film according to a second modulation signal, in the additional-information recording area after the deposition process. Formation of the first data sequence and formation of the second recording data sequence are performed so that, when laser light is applied onto the first recording data sequence and the second recording data sequence, the minimum level of reproduction signal amplitude in the first recording data sequence and the minimum level of reproduction signal amplitude in the second data sequence are substantially equal and the middle level of reproduction signal amplitude corresponding to the shortest pit or space in the first recording data sequence and the middle level of reproduction signal amplitude corresponding to the shortest mark or space in the second data sequence are substantially equal.

An information data modulation method in forming the first recording data sequence and an information data modulation method in forming the second recording data sequence are the same.

In the process for forming the second recording data sequence, the minimum level of reproduction signal amplitude in the first recording data sequence and the minimum level of reproduction signal amplitude in the second data sequence are adjusted to be substantially equal and the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the marks formed by erasing or reducing the reflective film.

In the shaping process, the minimum level of reproduction signal amplitude in the first recording data sequence and the minimum level of reproduction signal amplitude in the second data sequence are adjusted to be substantially equal and the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the pits.

A read-only optical disc medium according to the present invention includes an information recording surface having a concavo-convex shape formed according to a first modulation signal, and a reflective film for covering the information recording surface, and a recording track is formed so that the concavo-convex shape is a first recording data sequence formed by pits and lands. In the recording track in which the first recording data sequence formed by the pits and the lands is provided, an additional-information recording area in which the information recording surface is flat is provided. In the additional-information recording area, a second recording data sequence is formed by marks formed by erasing or reducing the reflective film according to a second modulation signal. In this case, when laser light is applied onto the first recording data sequence and the second recording data sequence, the minimum level of reproduction signal amplitude in the first recording data sequence and the minimum level of reproduction signal amplitude in the second data sequence are substantially equal.

Alternatively, when laser light is applied onto the first recording data sequence and the second recording data sequence, the middle level of reproduction signal amplitude corresponding to the shortest pit or space in the first recording data sequence and the middle level of reproduction signal amplitude corresponding to the shortest mark or space in the second data sequence are substantially equal.

Alternatively, when laser light is applied onto the first recording data sequence and the second recording data sequence, the minimum level of reproduction signal amplitude in the first recording data sequence and the minimum level of reproduction signal amplitude in the second data sequence are substantially equal, and the middle level of reproduction signal amplitude corresponding to the shortest pit or space in the first recording data sequence and the middle level of reproduction signal amplitude corresponding to the shortest mark or space in the second data sequence are substantially equal.

That is, in the present invention, in a stage in which disc substrates are mass-produced with a stamper, an area where pits and lands are not formed is formed beforehand as an additional-information recording area in a recording track in which a recording data sequence is formed by pits and lands. A metal alloy reflective film is provided on an information recording surface including this additional-information recording area.

After that, additional information is recorded as a second recording data sequence in the additional-information recording area by forming marks (hereinafter referred to as perforated marks) by erasing or reducing portions of the metal alloy reflective film.

That is, additional information is recorded in an area of a recording track in an information recording area (area in which information is recorded as a first recording data sequence of pits and lands and which includes management areas such as a content area and a lead-in).

Various information items are conceivable as additional information to be recorded as a second recording data sequence having perforated marks. For example, additional information may be an identification number unique to each read-only optical disc medium, or part of main data to be recorded on the read-only optical disc medium.

Here, when a first recording data sequence of pits and lands (hereinafter also referred to as a prepit signal sequence) and a second recording data sequence of perforated marks (hereinafter also referred to as a perforated mark signal sequence) are formed in this way, it is required to stably read out reproduction signals from both the prepit signal sequence and the perforated mark signal sequence.

In detection of a reproduction signal from the read-only optical disc medium, when a signal from a photodetector is input to a waveform equalization circuit for processing, if an input level of a prepit signal read out of a prepit signal sequence and an input level of a perforated mark signal read out of a perforated mark signal sequence are different, the waveform of an output signal distorts at a switch portion between the signals.

The slice level for binarizing the output signal is greatly influenced by the middle level (Isp) of reproduction signal amplitude corresponding to the shortest pit or space in the prepit signal sequence.

In the signal levels of the prepit signal and the perforated mark signal, the maximum levels of reproduction signal amplitude can be regarded as equal because both signals correspond to the mirror part. However, the minimum levels may be different according to the states in which the pits and the perforated marks are formed. That is, assuming that the minimum level of reproduction signal amplitude as the prepit signal is designated as Ibp and the minimum level of reproduction signal amplitude as the perforated mark signal is designated as Ibh, Ibp and Ibh may be different according to states in which the prepit signal sequence and the perforated mark signal sequence are formed.

Hence, the middle level (Ish) of reproduction signal amplitude corresponding to the shortest mark or space in the perforated mark signal sequence and the middle level (Isp) of reproduction signal amplitude corresponding to the shortest pit or space in the prepit signal sequence may similarly be different according to states in which the prepit signal sequence and the perforated mark signal sequence are formed.

In short, if the minimum levels Ibp and Ibh are greatly different and the middle levels Isp and Ish are greatly different, it is impossible to stably carry out signal processing in reproduction.

Accordingly, in the present invention, when a prepit signal sequence and a perforated mark signal sequence are reproduced with the same reading laser light, the minimum level (ibp) of reproduction signal amplitude in the prepit signal sequence and the minimum level (Ibh) of reproduction signal amplitude in the perforated mark signal sequence are made substantially equal.

Alternatively, when the prepit signal sequence and the perforated mark signal sequence are reproduced with the same reading laser light, the middle level (Isp) of reproduction signal amplitude corresponding to the shortest pit or space in the prepit signal sequence and the middle level (Ish) of reproduction signal amplitude corresponding to the shortest mark or space in the perforated mark signal sequence are made substantially equal.

Alternatively, both of these are satisfied.

According to the present invention, additional information data is recorded as a second recording data sequence of perforated marks in a portion of a recording track in an information recording area. The second recording data sequence of the perforated marks and a first recording data sequence of prepits are formed on the basis of modulation signals modulated in the same modulation method. Further, a prepit signal sequence (first recording data sequence) and a perforated mark signal sequence (second recording data sequence) are formed so that, when the prepit signal sequence and the perforated mark signal sequence are reproduced, the minimum level (ibp) of reproduction signal amplitude in the prepit signal sequence and the minimum level (Ibh) of reproduction signal amplitude in the perforated mark signal sequence are substantially equal or so that the middle level (Isp) of reproduction signal amplitude corresponding to the shortest pit or space in the prepit signal sequence and the middle level (Ish) of reproduction signal amplitude corresponding to the shortest mark or space in the perforated mark signal sequence are substantially equal.

From these, the present invention has advantages that additional information can be separately recorded in read-only optical disc media, that, even when a signal is input from a photodetector to a waveform equalization circuit, waveform distortion is not caused at a switch portion between a prepit signal and a perforated mark signal, that proper signal detection is possible even when a perforated mark signal is binarized by the slice level determined by a prepit signal, and that information including additional information can thereby be stably and reliably reproduced without a reproduction apparatus having a special reading function.

BEST MODE FOR CARRYING OUT THE INVENTION

An embodiment of the present invention will be described below. In the embodiment, an example in which a read-only optical disc medium according to the present invention is a DVD type read-only optical disc will be given.

First, processes for manufacturing a read-only optical disc 90 according to the embodiment will be described with reference to FIG. 1.

Figure 1:
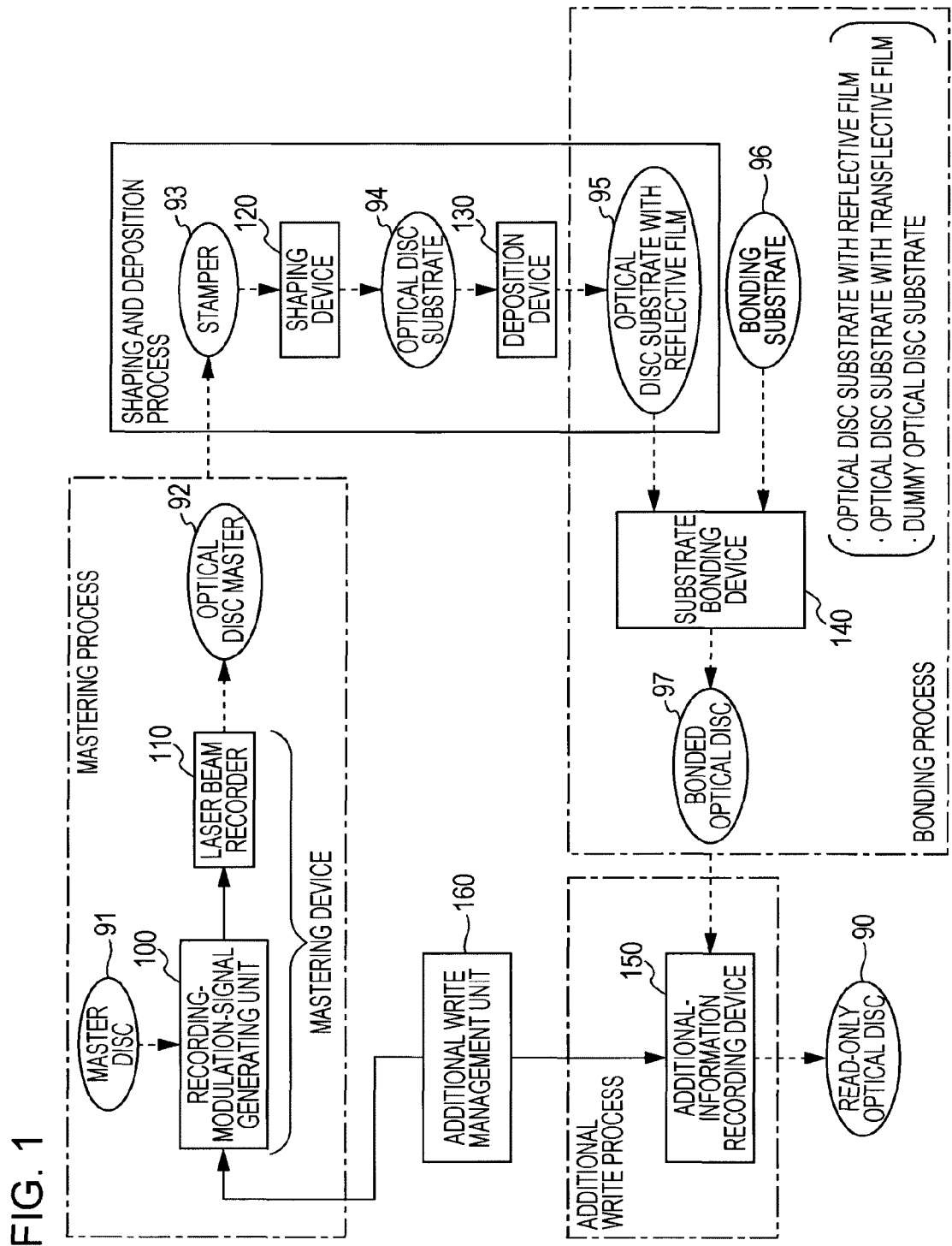
FIG. 1 is an explanatory view showing disc manufacturing processes according to an embodiment of the present invention.

FIG. 1 shows processes for manufacturing a read-only optical disc serving as a DVD according to the embodiment. As shown in the figure, the disc manufacturing processes of the embodiment roughly include a mastering process for forming an optical disc master with a laser beam, a shaping and deposition process for producing a number of disc substrates using a stamper produced from the optical disc master and forming a film on the disc substrates, a bonding process for bonding a pair of two optical discs having a thickness of 0.6 mm together with an adhesive having a predetermined thickness so as to form an optical disc having a thickness of 1.2 mm, and an additional write process for recording additional information, such as identification information, on each bonded optical disc.

The processes will be described.

The mastering process is a process in which an optical disc master 92 is produced on the basis of information data recorded on a master disc 91. In this process, a mastering device including a recording-modulation-signal generating unit 100 and a laser beam recorder 110 is used.

The recording-modulation-signal generating unit 100 reads information data to record by reproducing the master disc 91, subjects signals of the read information data to EFM+ (Eight to Fourteen Modulation plus) modulation, and outputs generated EFM+ signals to the laser beam recorder 110.

The optical disc master 92 is a glass plate coated with a photoresist serving as a photosensitive material. The coating thickness of the photoresist corresponds to the depth of pits. To change the depth of pits, it is only necessary to change the coating thickness of the photoresist. The laser beam recorder 110 applies laser light onto the optical disc master 92 according to the supplied EFM+ signals, and performs exposure with a pit pattern on the basis of the EFM+ signals. The width and length of pits can be adjusted by the intensity of the laser beam during exposure and the exposure time. After that, when the photoresist film is developed and the photoresist is a positive resist, exposed portions are melted and a concavo-convex pattern is shaped into the photoresist film, and a pit pattern (a concave-convex shape with pits and lands) that conforms to a predetermined format is formed on the surface of the optical disc master 92.

While the recording-modulation-signal generating unit 100 generates the EFM+ signals based on the signals read out of the master disc 91, as described above, it inserts unmodulated signals into a specific period of the EFM+ signals according to instructions from an additional write management unit 160.

In the timing period of the unmodulated signals, laser light is in an off state in the laser beam recorder 110. In other words, the unmodulated signals are inserted into the EFM+ signals, whereby unexposed sections are formed on the optical disc master 92. All of these sections serve as lands that are areas with no concavo-convex shape, which become an additional-information recording area that will be described below.

A mold called a stamper 93, on which the pit pattern of the optical disc master 92 is transferred in reverse, is produced on the basis of this optical disc master 92. Of course, the stamper 93 is also provided with an additional-information recording area.

Next, in the shaping and deposition process, first, a molding device 120 produces an optical disc substrate 94 with the stamper 93. The concavo-convex pattern formed on the optical disc master 92 is transferred onto the optical disc substrate 94 to form a pit pattern (prepit signal sequence).

As methods for producing the optical disc substrate 94, compression molding, injection molding, photo-curing, etc. are known.

Subsequently, a coating film, such as a reflective film, is deposited on the optical disc substrate 94, on which the pit pattern is transferred from the stamper 93, in a deposition device 130, whereby an optical disc substrate 95 with a reflective film is produced.

Next, in the bonding process, the optical disc substrate 95 with the reflective film and a bonding substrate 96 are bonded together.

As the bonding substrate 96, an optical disc substrate with a reflective film produced in a process similar to the above process, an optical disc substrate with a transflective film, or a dummy optical disc substrate that is not coated with a reflective film is used.

A substrate bonding device 140 bonds any of the bonding substrates 96 described above to the optical disc substrate 95 with the reflective film to produce a bonded optical disc 97.

As adhesion methods in bonding, a method using ultraviolet curing resin, a method using a sheet with an adhesive, etc. are known.

In the case of a conventional DVD, the above-described bonded optical disc 97 is a DVD as a completed product. However, in this embodiment, an additional-information recording area in which a pit pattern is not provided is provided in a section of a recording track on which the pit pattern is provided, as described above.

Hence, the additional write process is conducted on the bonded optical disc 97. In the additional write process, an additional-information recording device 150 writes additional information in the additional-information recording area on the bonded optical disc 97. For example, identification information that differs among optical discs is written as additional information.

The additional-information recording device 150 is instructed of positional information (address) about the additional-information recording area by the additional write management unit 160, is also supplied with additional information to write, and writes the additional information.

In this case, the additional-information recording device 150 performs writing by subjecting additional information to EFM+ modulation, applying high power laser pulses for recording according to EFM+ signals, and erasing or reducing the reflective film in the additional-information recording area so as to form perforated marks.

The width and length of the perforated marks can be adjusted by changing the output of the recording laser and the light emitting time. For example, before recording, the minimum level Ibp of reproduction signal amplitude of a prepit signal sequence and the middle level Isp of reproduction signal amplitude corresponding to the shortest pit or space in the prepit signal sequence are measured beforehand. Then, the output of the recording laser and light emitting time can be adjusted so that the minimum level Ibh of reproduction signal amplitude of a perforated mark signal sequence becomes substantially equal to the above-described minimum level Ibp, or the output of the recording laser or the light emitting time can be adjusted so that the middle level Ish of reproduction signal amplitude corresponding to the shortest mark or space in the perforated mark signal sequence becomes substantially equal to the above-described middle level Isp.

When this additional write process is completed, manufacturing of a read-only optical disc 90 is completed. Read-only optical discs 90 mass-produced in the above-described processes can be optical discs which have the same contents (music, pictures, a game, an application program, etc.) recorded thereon, and each of which has additional information unique thereto.

A read-only optical disc 90 (DVD) of the embodiment manufactured in the above-described manner will be described.

Figure 2:
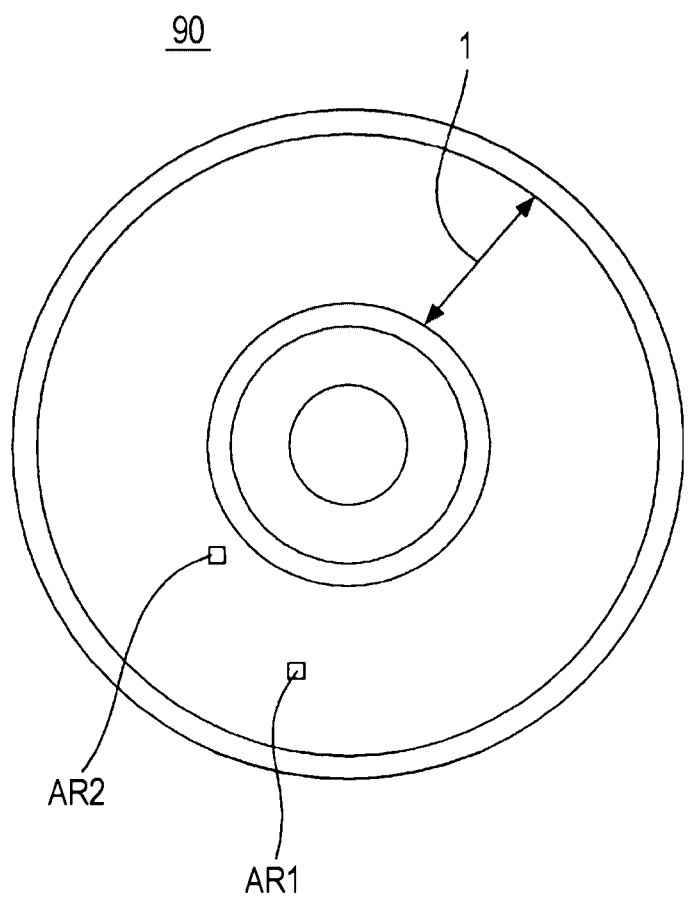
FIG. 2 is a plan view of a read-only optical disc according to the embodiment.

FIG. 2 is a plan view of the read-only optical disc 90. The read-only optical disc 90 is a disc having a diameter of 12 cm, and an area thereof in a radius range shown by the arrow serves as an information recording area 1. This information recording area 1 is an area in which a recording data sequence formed by pits/lands based on the EFM+ signals is provided, for example, as a spiral recording track, and which includes a lead-in area where management information is recorded, a content area where content data is recorded, a lead-out area, and so on.

Figure 3:
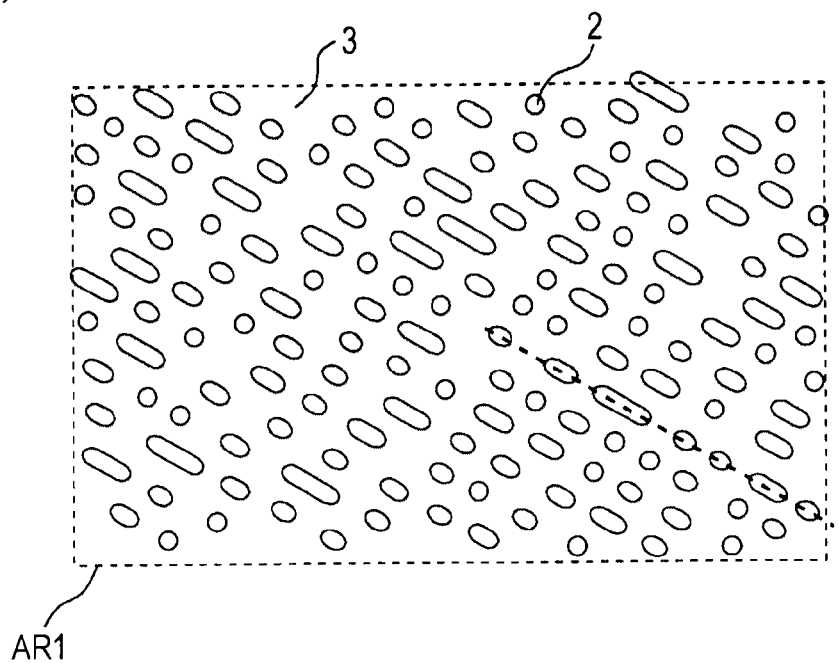
FIG. 3 includes an enlarged partial view and a schematic cross-sectional view of the read-only optical disc of the embodiment.
Figure 3:
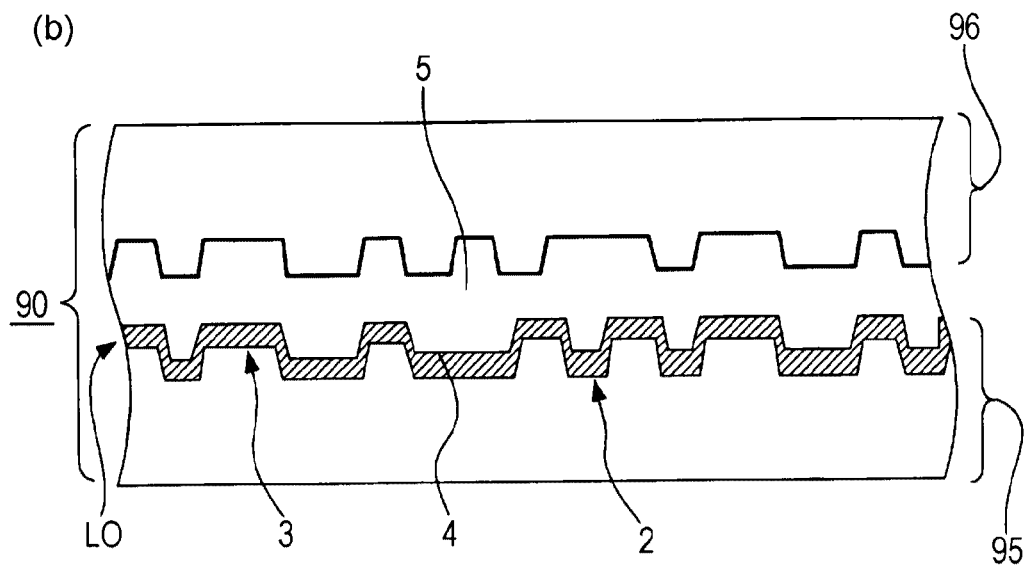
Figure 4:
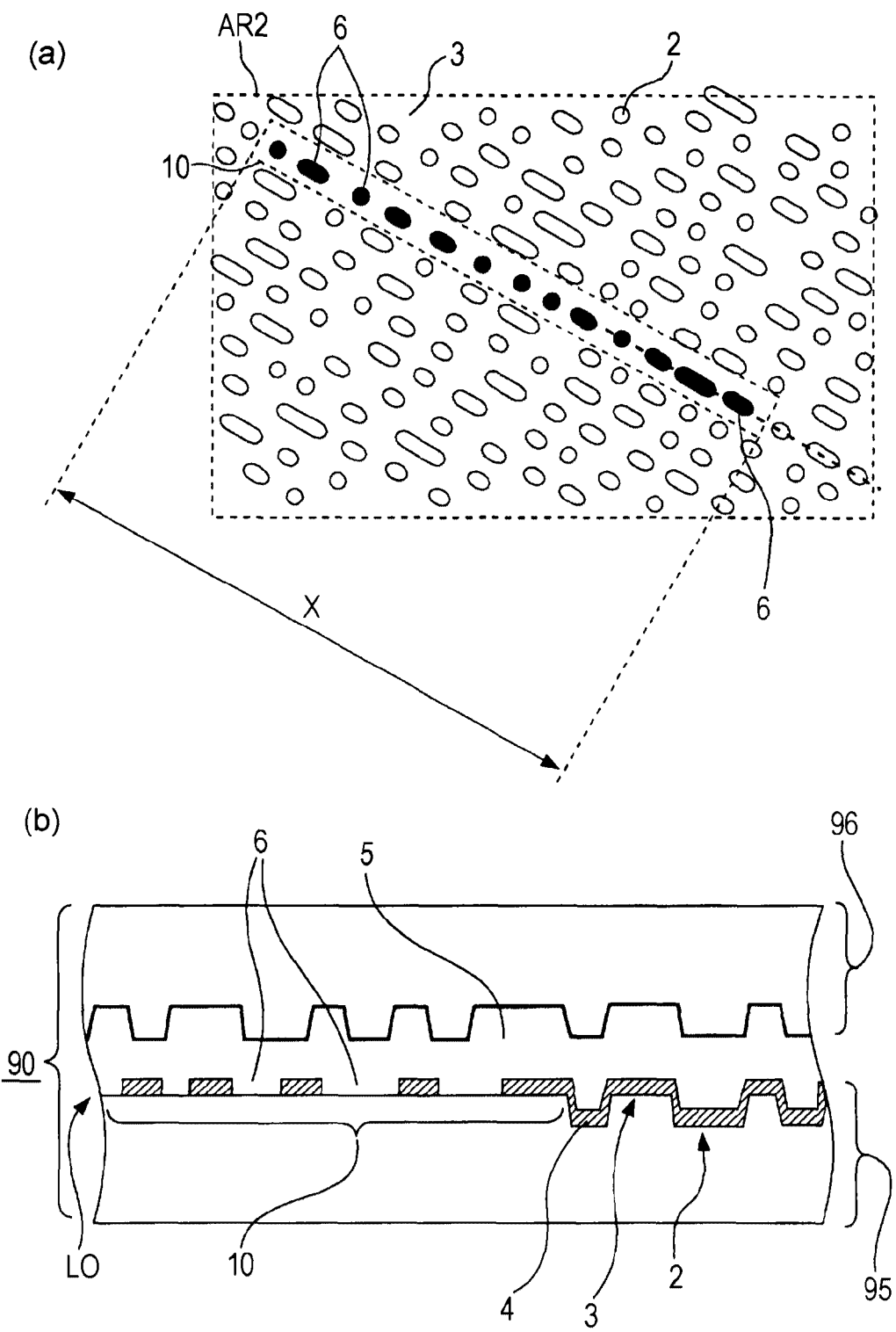
FIG. 4 includes an enlarged partial view and a schematic cross-sectional view of the read-only optical disc of the embodiment.

FIGS. 3 and 4 are enlarged partial views and schematic cross-sectional views of an area AR1 and an area AR2 of the information recording area 1 shown in FIG. 2.

In the area AR1, normal recording tracks serving as recording data sequences of pits and lands are generated. The area AR2 includes an additional-information recording area in which perforated pits are provided.

FIG. 3(*a*) is an enlarged view of the area AR1, and FIG. 3(*b*) is a schematic cross-sectional view of a portion shown by a broken line in FIG. 3(*a*).

FIG. 3(*a*) shows a state in which patterns serving as recording data sequences of pits 2 and lands 3 are provided.

As shown in FIG. 3(*b*), the read-only optical disc 90 is given a thickness of 1.2 mm by bonding an optical disc substrate 95 with a reflective film and a bonding substrate (dummy optical disc substrate) 96, for example, each of which is formed of polycarbonate and has a thickness of 0.6 mm, with an adhesive 5 (for example, an ultraviolet curing resin or an adhesive sheet).

In this case, one principal surface of the optical disc substrate 95 with the reflective film serves as an information recording surface L0. Recording data sequences (prepit signal sequences) are provided as a concavo-convex pattern with pits 2 and lands (spaces) 3 on the information recording surface L0. Further, a reflective film 4 is provided on the surfaces of the pits 2 and the lands 3.

The convex-concave relation of the pits 2 and the lands 3 may be reversed.

In FIG. 3(*b*), the bonding substrate 96 to be bonded to the optical disc substrate 95 with the reflective film is a dummy optical disc substrate (a disc substrate that is not coated with a reflective film). However, as described above, an optical disc substrate with a reflective film or an optical disc substrate with a transflective film may be used as the bonding substrate 96.

While the adhesive 5 typically transmits light, it does not need to transmit light, depending on the structure. When the bonding substrate 96 bonded to the optical disc substrate 95 with the reflective film has a reflective film or a transflective film, a surface on which the reflective film or the transflective film is provided serves as a bonding surface.

Next, FIG. 4(*a*) is an enlarged view of the area AR2 in FIG. 2, and FIG. 4(*b*) is a schematic cross-sectional view of a portion shown by a broken line in FIG. 4(*a*).

As shown in FIG. 4(*a*), a part of a certain track serves as an additional-information recording area 10. In the additional-information recording area 10, a recording data sequence (perforated mark signal sequence) formed by perforated marks 6 formed in the above-described additional write process is provided. In other words, additional information is recorded as a recording data sequence formed by perforated marks 6. Recording data sequences formed by pits 2 and lands 3 are provided before and after the additional-information recording area 10 in the track line direction. Further, in tracks adjacent to the additional-information recording area 10, recording data sequences of pits 2 and lands 3 are also provided.

As shown in FIG. 4(*b*), while the basic layer structure of the area AR2 is similar to that shown in FIG. 3(*b*), the perforated marks 6 are provided in portions of the information recording surface L0. In other words, the perforated marks 6 are formed in a manner such that the metal alloy reflective film 4 is erased or reduced and hardly exists.

Figure 5:
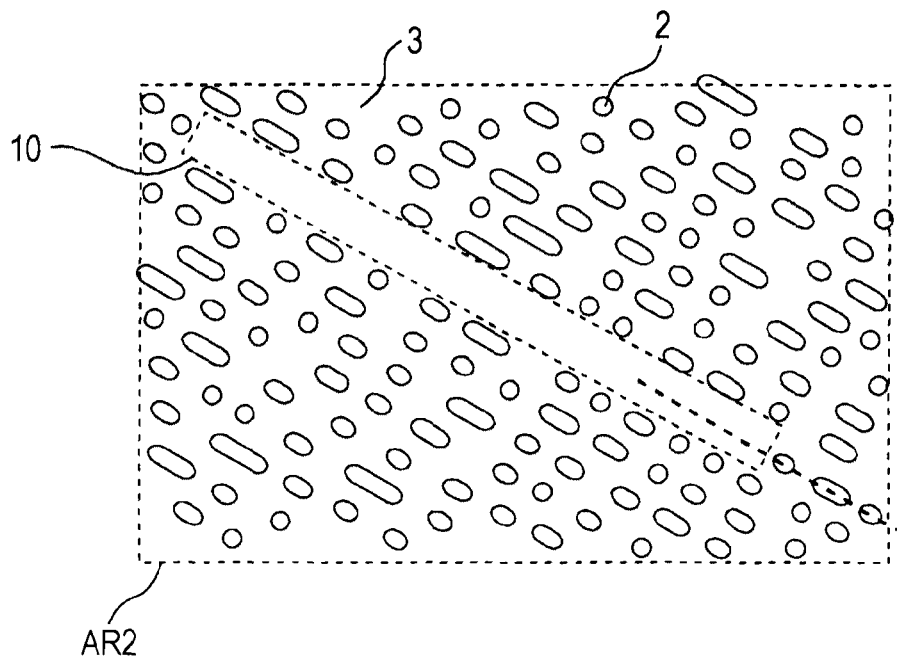
FIG. 5 includes an enlarged partial view and a schematic cross-sectional view of the read-only optical disc of the embodiment before additional information is recorded.
Figure 5:
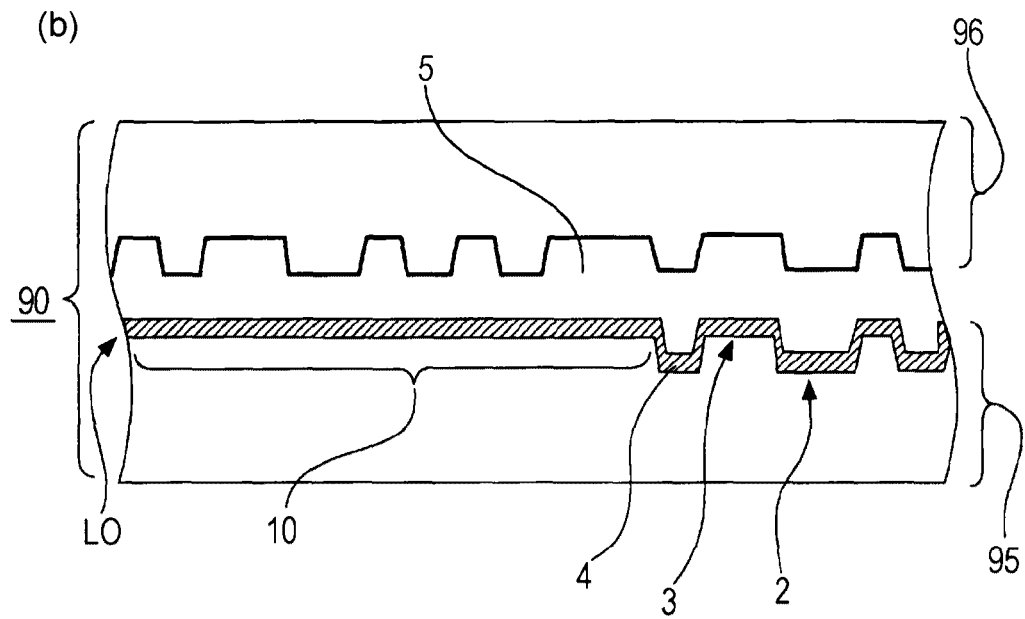

FIGS. 5(*a*) and 5(*b*) show a state before additional information is recorded in the above-described additional write process, corresponding to FIGS. 4(*a*) and 4(*b*).

As shown in FIG. 5(*a*), an additional-information recording area 10 is an area serving as an unmodulated section in which no concavo-convex pattern with pits 2 and lands 3 is formed. As apparent from FIG. 5(*b*), the additional-information recording area 10 exists on the same plane as the lands 3, and is covered with a reflective film 4 so as to form a so-called mirror part.

In the additional write process, additional information is recorded in the additional-information recording area 10.

That is, the above-described additional-information recording device 150 is prepared as an exclusive recording device using, for example, a high-power red semiconductor laser, has a function of tracking a pit sequence in the information recording area 1, for example, by DVD (differential phase detection) and a function of emitting high power laser pulses for recording in a desired section, and performs recording in the additional-information recording area 10 in a state shown in FIG. 5(*a*) so as to form perforated marks 6, as shown in FIG. 4. In this case, the light emitting pattern is modulated using EFM+ signals in the same modulation method as that corresponding to the pit sequences in the information recording area.

Figure 6:
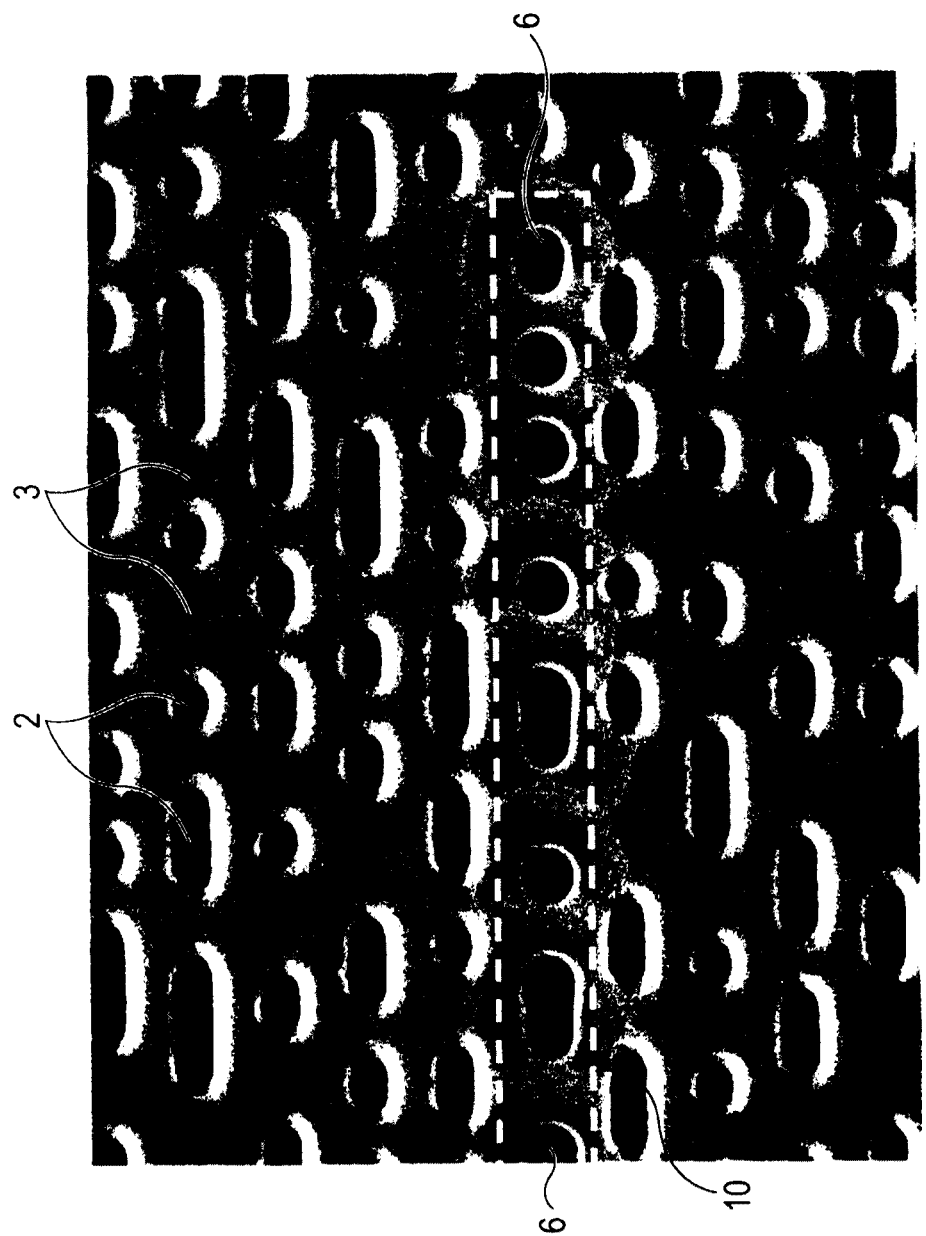
FIG. 6 is an explanatory view using an SEM photograph of an additional-information recording area in the read-only optical disc of the embodiment.

FIG. 6 shows a sample in which perforated marks 6 are formed by incidence of a high power laser so as to record additional information in the additional-information recording area 10 on the read-only optical disc 90. This is an SEM (scanning electron microscope) observation photograph of the additional-information recording area 10 in which the perforated marks 6 are formed.

In SEM observation, the optical disc substrate 95 with the reflective film was peeled off the bonding substrate 96 (dummy optical disc substrate) at the bonding surface, and observation was performed while electron beams were incident on a portion in which the reflective film 4 was exposed. As the reflective film 4, an Al alloy using Al as a base alloy containing about 1 atom percent of Fe and about five atom percent of Ti was used.

As shown in FIG. 6, the metal alloy reflective film provided in the additional-information recording area 10 is erased or reduced in accordance with modulation signals of additional information, whereby elliptic holes are formed, and perforated marks 6 corresponding to pits are formed finely.

To use this read-only optical disc 90 of the embodiment as a DVD, of course, the read-only optical disc 90 needs to be a disc that conforms to the DVD standards. That is, the portion where the recording data sequence is formed by the perforated marks 6 also needs to conform to the DVD standards.

For that purpose, the recording data sequence with the perforated marks 6 needs to satisfy at least the following conditions:

The recording data sequence formed by the perforated marks 6 satisfies a run-length limitation.

The reflectance of the recording data sequence of the perforated marks 6 conforms to the DVD standards.

The reproduction signal modulation degree of the recording data sequence of the perforated marks 6 conforms to the DVD standards.

The reproduction signal asymmetry of the recording data sequence of the perforated marks 6 conforms to the DVD standards.

The jitter value of the recording data sequence of the perforated marks 6 conforms to the DVD standards.

First, the fact that the recording data sequence formed by the perforated marks 6 satisfies a DVD run-length limitation necessitates that there is provided a pattern of perforated marks 6 of 3T to 14T (T represents the channel clock period) and lands. For this purpose, additional information is modulated into EFM+ signals in a manner similar to that adopted in normal formation of a recording data sequence of pits and lands, perforated marks 6 are formed on the basis of the EFM+ signals, and the run-length limitation is satisfied in the relationship with pit sequences before and after the additional-information recording area.

Here, the perforated marks 6 are portions formed by erasing or reducing the reflective film, and spaces (lands) between perforated marks 6 are portions where the reflective film is left normally. Basically, the spaces between the perforated marks 6 have a film thickness similar to that of the lands 3 in the recording data sequence of pits 2 and lands 3. Therefore, almost the same maximum level of reproduction signal amplitude, that is, I14H can be obtained at the prepit portions and at the perforated marks.

The modulation degree is specified as follows in the DVD standards:

$I14/I14H \geq 0.60$ $I3/I14 \geq 0.15$ (in the case of a single layer disc)

$I3/I14 \geq 0.20$ (in the case of a two-layer disc)

Further, the asymmetry is specified as follows in the DVD standards:

$-0.05 \leq \{(I14H+I14L)/2-(I3H+I3L)/2\}/I14 \leq 0.15$

Figure 7:
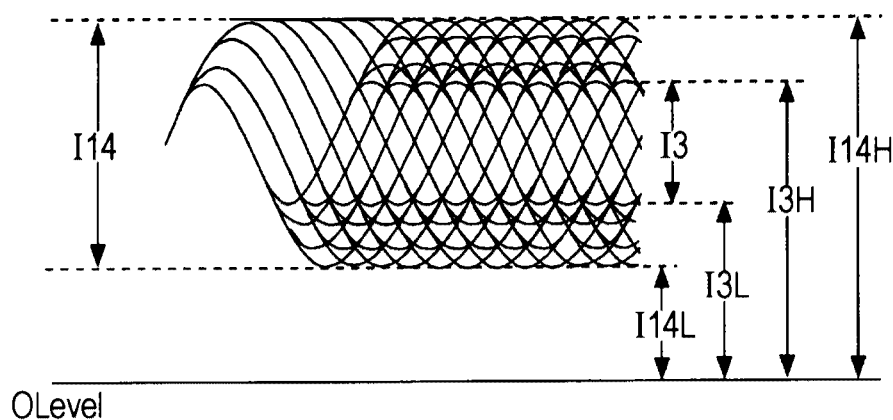
FIG. 7 is an explanatory view of an eye pattern of a reproduction signal.

FIG. 7 is a schematic view of an eye pattern of a reproduction signal. I14 is the peak-to-bottom amplitude level of a 14T pattern, I14H is the peak level of the 14T pattern, I14L is the bottom level of the 14T pattern, I3 is the peak-to-bottom amplitude level of a 3T pattern, I3H is the peak level of the 3T pattern, and I3L is the bottom level of the 3T pattern.

Therefore, the minimum level Ibp of reproduction signal amplitude of the prepit signal sequence and the minimum level Ibh of reproduction signal amplitude of the perforated mark signal sequence correspond to I14L of the prepit signal and I14L of the perforated mark signal, respectively.

Further, the middle level Isp of reproduction signal amplitude corresponding to the shortest pit or space in the prepit signal sequence and the middle level Ish of reproduction signal amplitude corresponding to the shortest mark or space in the perforated mark signal sequence correspond to (I3H+I3L)/2 of the prepit signal and (I3H+I3L)/2 of the perforated mark signal, respectively.

Figure 8:
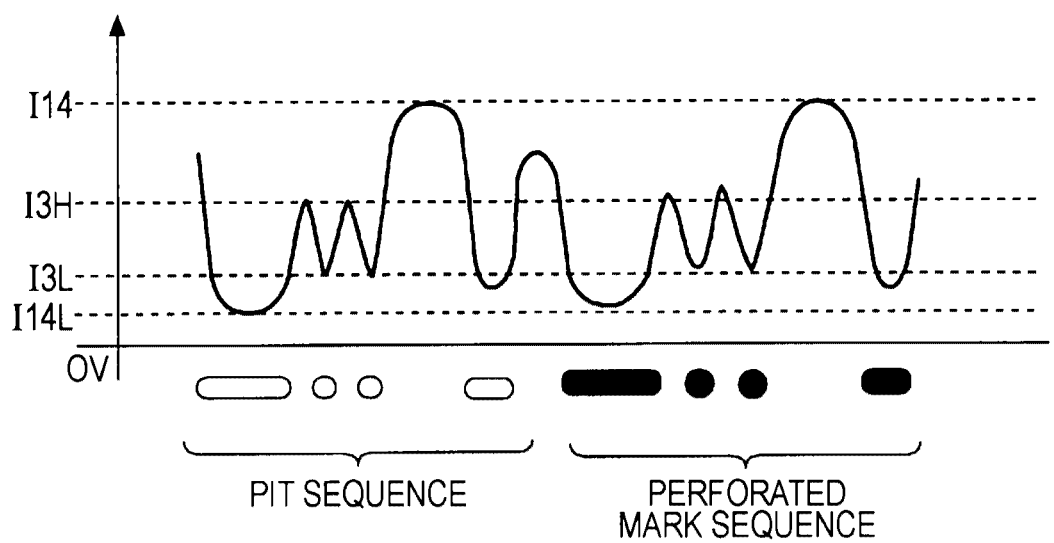
FIG. 8 is an explanatory view showing the waveform of the reproduction signal in the embodiment.
Figure 10:
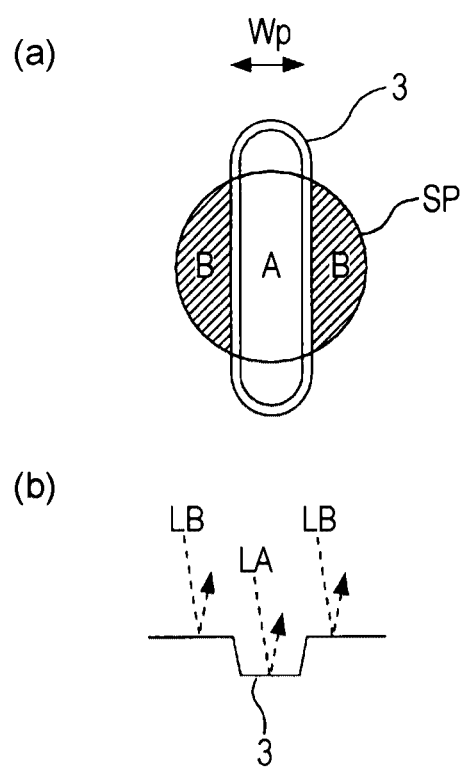
FIG. 10 is an explanatory view showing the change in modulation degree in accordance with the pit width.

FIG. 8 schematically shows the reproduction signal amplitude in a recording data sequence of pits 2 and lands 3 and the reproduction signal amplitude in a recording data sequence of perforated marks 6 corresponding to the signal from the photodetector. According to the read-only optical disc medium manufacturing method of this embodiment, as shown in FIG. 10, substantially equal levels can be obtained as I14H, I14L, I3H, and I3L from the recording data sequence of pits 2 and lands 3 and from the recording data sequence of perforated marks 6, and the above-described standards of modulation degree and asymmetry can be satisfied. In the reproduction apparatus, even when a signal from the photodetector is input to a waveform equalization circuit, waveform distortion is not caused in a switch portion between a prepit signal and a perforated mark signal. Further, even when the perforated mark signal is binarized by the slice level determined by the prepit signal, signal detection can be performed properly.

The fact that substantially equal levels are obtained as I14H, I14L, I3H, and I3L of the reproduction signal amplitude means that the minimum level (Ibp) of reproduction signal amplitude in the prepit signal sequence and the minimum level (Ibh) of reproduction signal amplitude in the perforated mark signal sequence are substantially equal and that the middle level (Isp) of reproduction signal amplitude corresponding to the shortest pit or space in the prepit signal sequence and the middle level (Ish) of reproduction signal amplitude corresponding to the shortest mark or space in the perforated mark signal sequence are substantially equal. The measure of substantially equal levels is as follows:

For substantially equal levels, the index value of the perforated mark signal sequence (the minimum level Ibh for the modulation degree and the middle level Ish for the asymmetry) needs only to be within ±15% of the index value of the prepit signal sequence (the minimum level Ibp for the modulation degree and the middle level Isp for the asymmetry).

That is, it is known that desired effects can be obtained as proper signal reproduction in the following cases:

$|(Ibp-Ibh)/Ibp|<0.15$ $|(Isp-Ish)/Isp|<0.15$

Regarding the jitter value (with respect to the channel bit clock time), the recording data sequence needs to only be formed by perforated marks 6 so that the jitter value is smaller than or equal to 8.0%.

Here, a description will be given of an adjustment method carried out in manufacturing so that the modulation degrees and asymmetries in the prepit signal sequence and the perforated mark signal sequence are substantially equal.

First, as described above, to stably read out both the prepit signal sequence and the perforated mark signal sequence, reproduction signal modulation degrees of the signal sequences need to be substantially equal.

Regarding the reproduction signal intensity of the perforated mark signal sequence, it is difficult for the modulation degree to be more than or equal to 85% according to the reproduction principle (reflectance difference reproduction) and the principle of generation of recording marks (melting of the film by heat). Therefore, a reproduction signal modulation degree that is greatly different from 85% cannot be set in the pit signal sequence. For this reason, it is preferable that the reproduction signal modulation degree of the prepit signal sequence be less than or equal to 90%.

Further, to stably read out the prepit signal sequence in a state in which the SNR (Signal Noise Ratio) is good, it is preferable that the reproduction signal modulation degree of the prepit signal sequence be more than or equal to 80%.

Hence, it is preferable that the reproduction signal modulation degree of the prepit signal sequence be more than or equal to 80% and less than or equal to 90%. Therefore, in the perforated mark signal sequence that needs substantially equal signals, it is also preferable that the reproduction signal modulation degree be more than or equal to 80% and less than or equal to 90%.

The modulation degree and asymmetry of the reproduction signal amplitude in the prepit signal sequence are adjusted in the mastering process. As the method for adjusting the modulation degree in the prepit signal sequence, the above-described methods using the coating thickness of the photoresist, the laser beam intensity during exposure of the master, and the laser beam emitting time (exposure time) are conceivable.

Figure 9:
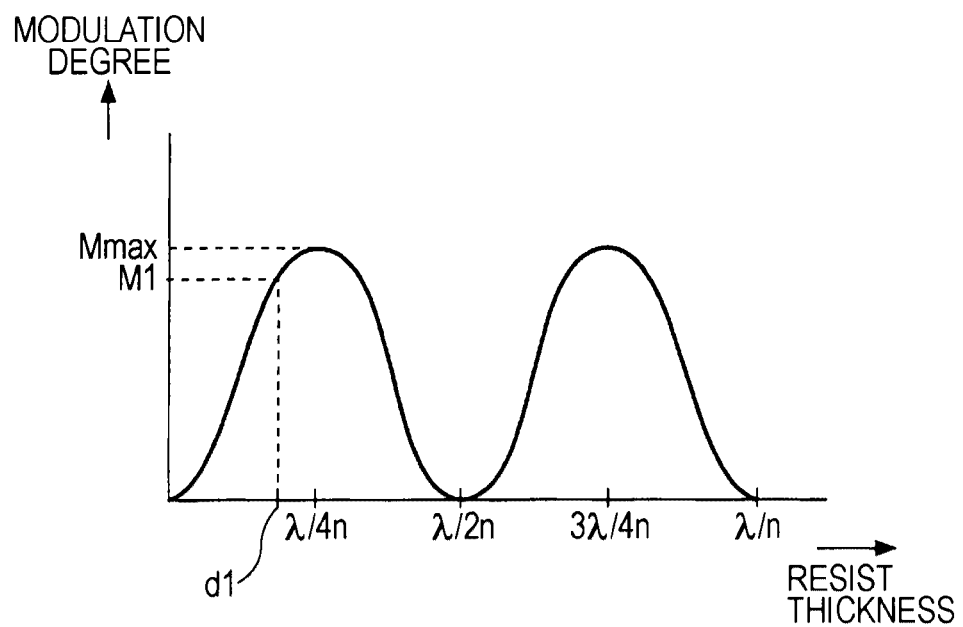
FIG. 9 is an explanatory view showing the relationship between the pit depth and the modulation degree.

FIG. 9 shows the relationship between the thickness of the resist applied on the optical disc master 92 (i.e., the pit depth in the read-only optical disc 90) and the modulation degree. Regarding the refractive index n of the substrate and the wavelength λ of the reproduction laser light, when λ/4n and 3λ/4n, the reproduction signal modulation degree is maximized (Mmax).

Here, to make the modulation degree substantially equal to that of the perforated mark signal sequence, as described above, it is appropriate to set the modulation degree of the prepit signal sequence so as to easily match that of the perforated mark signal sequence.

Assuming that a modulation degree M1 in FIG. 9 is a desired modulation degree that is more than or equal to 80% and less than or equal to 90%, one adjustment method is to set the thickness of the resist applied on the optical disc master in the mastering process at dl in the figure.

Depending on the laser beam intensity during exposure of the master, the pit width is adjustable. Here, reproduction of the read-only optical disc 90 will be considered. FIG. 10(a) shows a laser spot SP for reproduction and a pit 3.

As is well known, in a prepit signal sequence, when the laser sport SP is thus applied to the pit 3, the intensity of reflected light varies according to the phase difference between reflected light (LA in FIG. 10(b)) from a region A (pit portion) and reflected light (LB in FIG. 10(b)) from regions B (outside the pit).

When the pit width Wp changes, the area ratio between the region A and the regions B also changes. In this case, the light quantity ratio between the reflected light LA and the reflected light LB that interfere with each other changes. As a result, the reproduction signal modulation degree changes.

In other words, adjustment and setting of the laser beam intensity for exposure of the master in the mastering process and proper setting of the pit width is also a method for adjusting the modulation degree of the prepit signal sequence.

Also, adjustment can be made by finely adjusting the pit length in accordance with the laser beam emitting time (exposure time) during exposure of the master.

The pit length itself is defined as, for example, 3T to 14T, and the laser emitting time is set corresponding to each pit length of T. By finely adjusting the laser emitting time for each pit length of T, the pit length of T can be increased or reduced slightly.

That is, in the stage of the read-only optical disc 90, the edge position of the pit 2 is adjusted finely.

When the pit 2 has a short T (e.g., about 3T to 6T), adjustment of the edge position of the pit 2 corresponds to adjustment of the DC level of the reproduction signal. A pit having a short T refers to a pit whose amplitude does not reach the maximum amplitude (e.g., I14 in FIG. 7).

Therefore, properly setting the laser beam emitting time (exposure time) is also a method for adjusting the modulation degree of the prepit signal sequence.

While adjustment of the modulation degree of the prepit signal sequence has been described above, similar methods can be used from the viewpoint of adjustment of the asymmetry as the level between the maximum amplitude and the minimum amplitude.

The above-described adjustment of the prepit signal sequence needs only to be performed so that the modulation degree and asymmetry of the perforated mark signal sequence can easily match those of the prepit signal sequence.

Next, an adjustment method for a perforated mark signal sequence will be described.

While a perforated mark signal sequence is recorded in the additional write process, the width and length of a perforated mark 6 can be adjusted by changing the recording laser output from the additional-information recording device 150 or the light emitting time.

Figure 11:
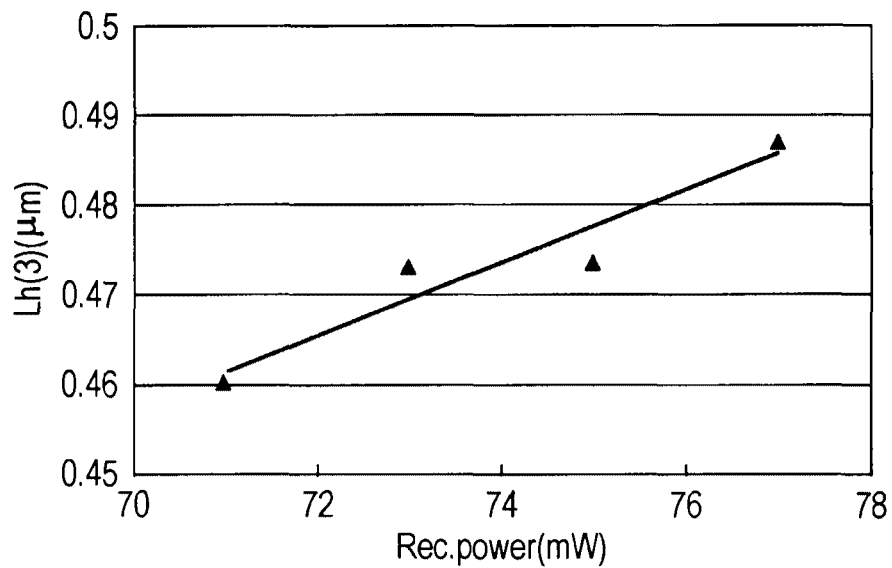
FIG. 11 is an explanatory view showing the relationship between the length of a perforated mark and recording laser power in the embodiment.
Figure 11:
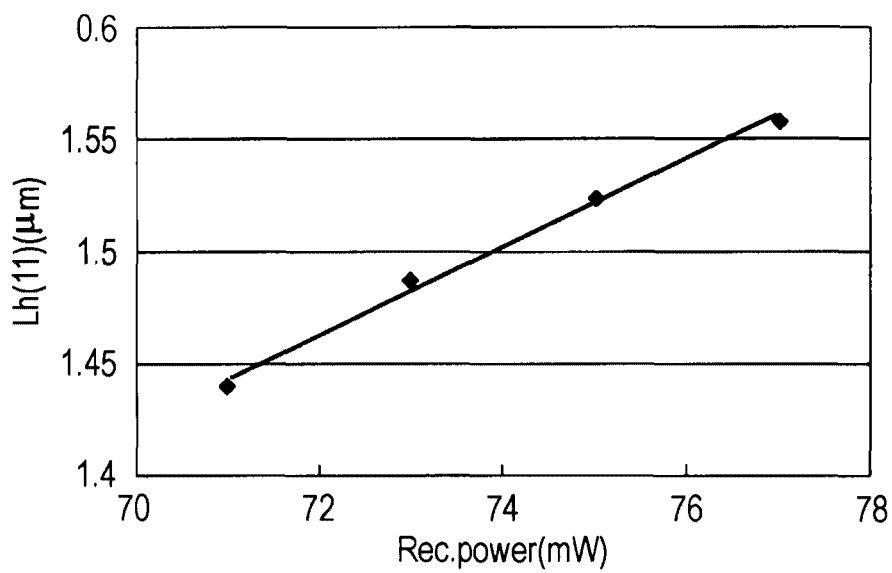
Figure 12:
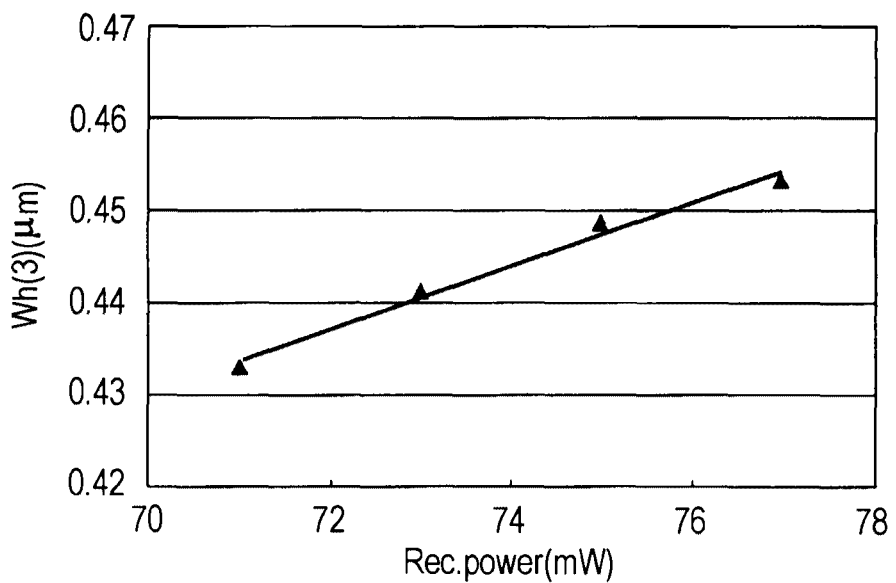
FIG. 12 is an explanatory view showing the relationship between the width of the perforated mark and the recording laser power in the embodiment.
Figure 12:
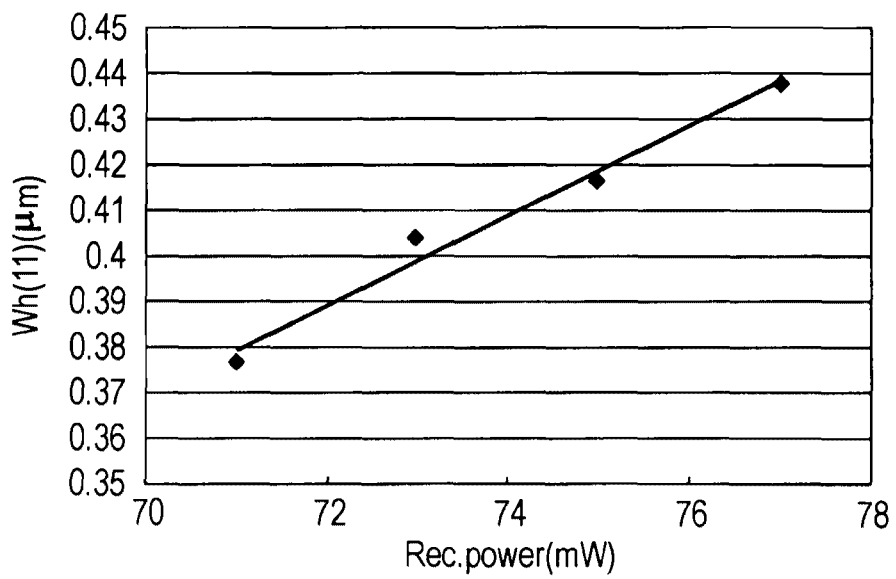

FIGS. 11 and 12 show the examined relationships between the recording laser power for forming a perforated mark 6, and the width and length of the perforated mark 6.

Figure 14:
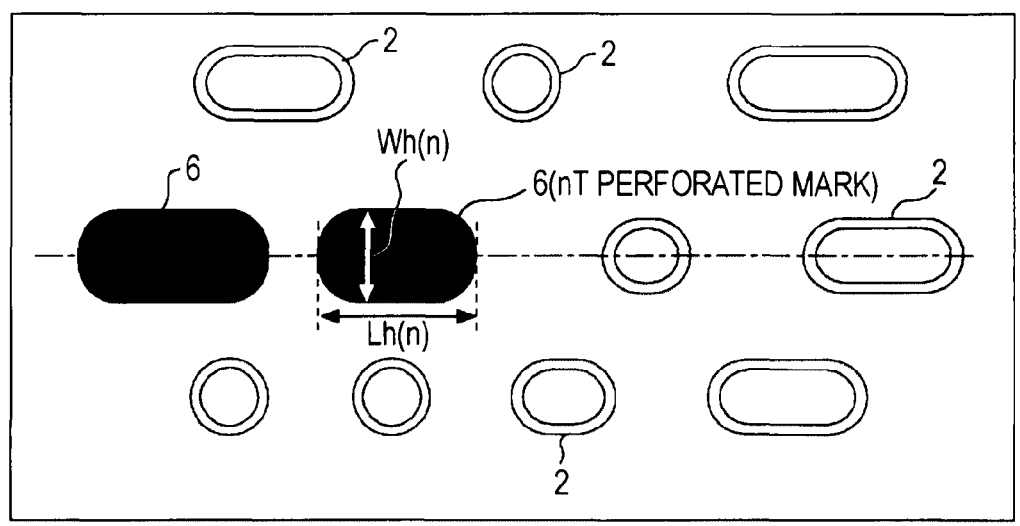
FIG. 14 is an explanatory view showing the length and width of the perforated mark in the embodiment.

The width Wh and length Lh of the perforated mark 6 correspond to the sizes of a portion shown in FIG. 14. The width Wh(n) and length Lh(n) represent the width and length of an nT mark.

FIG. 11(a) shows the relationship between the recording laser power and a length Lh(3) of a 3T mark, and FIG. 11(b) shows the relationship between the recording laser power and a length Lh(11) of an 11T mark.

FIG. 12(a) shows the relationship between the recording laser power and a width Wh(3) of the 3T mark, and FIG. 12(b) shows the relationship between the recording laser power and a width Wh(11) of the 11T mark.

Figure 13:
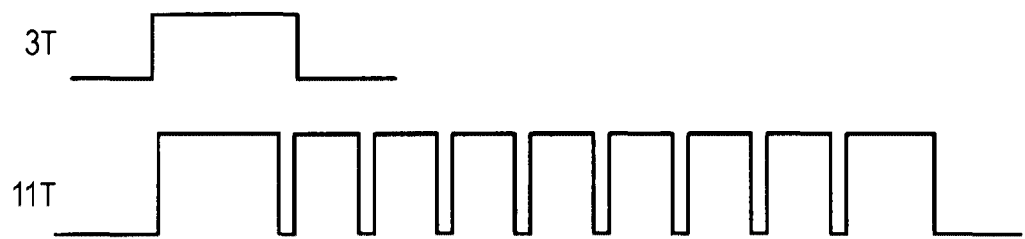
FIG. 13 is an explanatory view showing a recording laser pulse in an experiment according to the embodiment.

In this measurement, recording laser light was emitted using an [n–2] type recording compensating pattern, as shown in FIG. 13. In this pattern, a perforated mark 6 having a length of 3T is recorded by one pulse, and a perforated mark 6 having a length of 11T is recorded by nine pulses. It was better that the distance between the pulses was shorter than T.

As shown in FIGS. 11 and 12, in the 3T mark and the 11T mark, the width and length of the perforated mark 6 can be controlled by the recording laser power.

While the relationships of the width and length of the perforated mark shown in FIGS. 11 and 12 were obtained by fixing the pulse emitting time, as shown in FIG. 13 and changing the recording laser power in this experiment, the optical energy quantity is changed and the width and length of the perforated mark can be controlled by changing the pulse emitting time. In this case, relationship graphs are different from those shown in FIGS. 11 and 12, but the width and length of the perforated mark 6 can be controlled by the recording laser power and the pulse emitting time.

Since the width and length of the perforated mark 6 can be controlled in this way, the modulation degree and asymmetry of the perforated mark signal sequence can be adjusted.

First, the width Wh of the perforated mark 6 will be considered. Signal reproduction from the perforated mark signal sequence is based on the difference in quantity of reflected light. That is, a reproduction signal amplitude is obtained by the difference in quantity of reflected light based on the difference in reflectance between the mark portion and the space portion. As the width Wh of the perforated mark 6 increases, the modulation degree increases.

Further, for example, in the case of 3T to 6T marks, the DC level of the reproduction signal can be adjusted by finely adjusting the length Lh of the perforated mark 6, similarly to the above-described prepit signal sequence.

Therefore, by setting the recording laser power for recording the perforated mark signal sequence in the additional write process, the modulation degree and asymmetry of the reproduction signal in the perforated mark signal sequence can be made to substantially coincide with those of the prepit signal sequence.

That is, in this embodiment, for example, first, in the mastering process, the minimum level Ibp of reproduction signal amplitude of a prepit signal sequence to be formed and the middle level Isp of reproduction signal amplitude corresponding to the shortest pit or space in the prepit signal sequence are set to be adjustable in a perforated mark signal sequence. Specifically, the thickness of a resist applied on the optical disc master 92, and the recording laser power and the light emitting time of the laser beam recorder 110 are set properly.

In the shaping and deposition process, the optical disc substrate 95 with the reflective film is produced on the basis of the optical disc master 92 formed with such settings. Further, in the bonding process, the bonded optical disc 97 is produced.

In the additional write process, a perforated mark signal sequence is recorded on the bonded optical disc 97. In this case, the recording laser power and the light emitting time of the additional-information recording device 150 are adjusted.

As a result, it is possible to manufacture the read-only optical disc 90 in which the minimum level Ibp of reproduction signal amplitude in the prepit signal sequence and the minimum level Ibh of reproduction signal amplitude in the perforated mark signal sequence substantially coincide with each other and in which the middle level Isp of reproduction signal amplitude corresponding to the shortest pit or space in the prepit signal sequence and the middle level Ish of reproduction signal amplitude corresponding to the shortest mark or space in the perforated mark signal sequence substantially coincide with each other.

A description will be given below of experiment results which verified that, after additional information was recorded as a recording data sequence of perforated marks 6 on a DVD serving as the read-only optical disc 90 manufactured by the read-only optical disc medium manufacturing method of the embodiment, a signal could be detected from the DVD without needing a reproduction apparatus having a special reading function.

In the experiments, an optical disc substrate having a plurality of additional-information recording areas 10 in a content area was prepared, and an Al alloy film of about 35 nm having a composition different from that of the Al alloy film used in FIG. 6 was formed thereon, and the optical disc substrate was bonded to a dummy optical disc substrate, whereby a read-only DVD was manufactured.

The length X (see FIG. 4) of the additional-information recording areas 10 in the track line direction was set to about 40 μm.

Next, additional information was formed by perforated marks 6 in all of the plurality of additional-information recording areas 10 in consideration of information data of pit sequences before and after each of the additional-information recording areas 10 so that EFM+ signals were correctly decoded after reproduction signals are detected. As the additional-information recording device 150 used to form the perforated marks 6, a high output laser writer provided with an optical system having a wavelength of 650 nm and including an objective lens with an NA of 0.60 was used.

If recording of the additional information into the additional-information recording area 10 is not successful, for example, when I14L (the minimum level of signal amplitude) is not substantially equal between the prepit signal and the perforated mark signal and/or (I3H+I3L)/2 (that is, the middle level of reproduction signal amplitude corresponding to the shortest pit(mark)/space) is not substantially equal between the prepit signal and the perforated mark signal, decoding errors increase because of distortion of the perforated mark by waveform equalization and variations in detected binary signals due to displacement of the slice level. At worst, reading becomes impossible.

Experimental Example 1

A read-only optical disc 90 (DVD) was prepared in which recording was performed in an additional-information recording area 10 with a laser output from the additional-information recording device 150 being 64 mW on the disc surface.

In this case, commercially available DVD players respectively produced by seven manufacturers were prepared, and a reproduction test was carried out. As a result, decoding errors occurred in all of the seven models, and reproduction was impossible. In this case, I14L of the perforated mark signal was larger than I14L of the prepit signal, (I3H+I3L)/2 of the perforated mark signal was also larger than that of the prepit signal, and the values were different.

Experimental Example 2

First, a read-only optical disc 90 (DVD) was prepared in which recording was performed in an additional-information recording area 10 with a laser output from the additional-information recording device 150 being 66 mW on the disc surface.

Next, commercially available DVD players respectively produced by seven manufacturers were prepared, and a reproduction test was carried out. As a result, additional information could be read out by five of the models, but reading errors occurred and reproduction could not be performed in two of the models. In this case, I14L of the perforated mark signal was slightly larger than I14L of the prepit signal, and (I3H+I3L)/2 of the perforated mark signal was larger than that of the prepit signal, although the differences are smaller than in Experimental Example 1.

Experimental Example 3

A read-only optical disc 90 (DVD) was prepared in which recording was performed in an additional-information recording area 10 with a laser output from the additional-information recording device 150 being 68 mW on the disc surface.

Commercially available DVD players respectively produced by seven manufacturers were prepared, and a reproduction test was carried out. As a result, additional information could be read out in all the seven models without causing any decoding error.

Experimental Example 4

A read-only optical disc 90 (DVD) was prepared in which recording was performed in an additional-information recording area 10 with a laser output from the additional-information recording device 150 being 73 mW on the disc surface.

Then, commercially available DVD players respectively produced by seven manufacturers were prepared, and a reproduction test was carried out. As a result, additional information could be read out in all the seven players without causing any decoding error.

From the above results, it is verified that, when additional information is recorded by recording perforated marks 6 with appropriate laser output in Experimental Example 3 and Experimental Example 4, the read-only optical disc 90 of this embodiment can be reproduced with an ordinary commercially available DVD player without necessitating a special reading apparatus.

While the case in which the recording condition for generating the perforated marks 6 is adjusted has been described here, it is also effective to adjust the depth and width of the pits 2 in the prepit signal sequence, as described above.

The invention claimed is:

1. A manufacturing method for a read-only optical disc medium, comprising:
    forming a concavo-convex shape on an information recording surface according to a first modulation signal by a shaping process;
    covering the information recording surface with a reflective film by a deposition process;
    forming a recording track in which the concavo-convex shape is provided as a first recording data sequence formed by pits and lands;
    forming an additional-information recording area in which the information recording surface is flat on the information recording surface and in the recording track in which the first recording data sequence is formed by the pits and the lands in the shaping process; and
    forming a second recording data sequence by marks, which are formed by erasing or reducing the reflective film according to a second modulation signal, in the additional-information recording area on the information recording surface after the deposition process, and
    wherein formation of the first recording data sequence and formation of the second recording data sequence are performed so that the minimum level of reproduction signal amplitude in the first recording data sequence and the minimum level of reproduction signal amplitude of the second recording data sequence are substantially equal when laser light is applied onto the first recording data sequence and the second recording data sequence.

2. The manufacturing method for a read-only optical disc medium according to claim 1, wherein an information data modulation method in forming the first recording data sequence and an information data modulation method in forming the second recording data sequence are the same.

3. The manufacturing method for a read-only optical disc medium according to claim 1, wherein, in the forming the second recording data sequence, the minimum level of reproduction signal amplitude in the first recording data sequence and the minimum level of reproduction signal amplitude of the second recording data sequence are adjusted to be substantially equal by adjusting the width and/or length of the marks formed by erasing or reducing the reflective film.

4. The manufacturing method for a read-only optical disc medium according to claim 1, wherein, in the shaping process, the minimum level of reproduction signal amplitude in the first recording data sequence and the minimum level of reproduction signal amplitude in the second recording data sequence are adjusted to be substantially equal by adjusting the width and/or length of the pits.

5. A manufacturing method for a read-only optical disc medium, comprising:
    forming a concavo-convex shape on an information recording surface according to a first modulation signal by a shaping process;
    covering the information recording surface with a reflective film by a deposition process;
    forming a recording track in which the concavo-convex shape is provided as a first recording data sequence formed by pits and lands;
    forming an additional-information recording area in which the information recording surface is flat on the information recording surface and in the recording track in which the first recording data sequence is formed by the pits and the lands in the shaping process; and
    forming a second recording data sequence by marks, which are formed by erasing or reducing the reflective film according to a second modulation signal, in the additional-information recording area on the information recording surface after the deposition process, and
    wherein formation of the first recording data sequence and formation of the second recording data sequence are performed so that the middle level of reproduction signal amplitude corresponding to the shortest pit or space in the first recording data sequence and the middle level of reproduction signal amplitude corresponding to the shortest mark or space in the second recording data sequence are substantially equal when laser light is applied onto the first recording data sequence and the second recording data sequence.

6. The manufacturing method for a read-only optical disc medium according to claim 5, wherein an information data modulation method in forming the first recording data sequence and an information data modulation method in forming the second recording data sequence are the same.

7. The manufacturing method for a read-only optical disc medium according to claim 5, wherein, in the forming the second recording data sequence, the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the marks formed by erasing or reducing the reflective film.

8. The manufacturing method for a read-only optical disc medium according to claim 5, wherein, in the shaping process, the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the pits.

9. A manufacturing method for a read-only optical disc medium, comprising:
    forming a concavo-convex shape on an information recording surface according to a first modulation signal by a shaping process;
    covering the information recording surface with a reflective film by a deposition process;
    forming a recording track in which the concavo-convex shape is provided as a first recording data sequence formed by pits and lands;
    forming an additional-information recording area in which the information recording surface is flat on the information recording surface and in the recording track in which the first recording data sequence is formed by the pits and the lands, in the shaping process; and
    forming a second recording data sequence by marks, which are formed by erasing or reducing the reflective film according to a second modulation signal, in the additional-information recording area on the information recording surface after the deposition process, and
    wherein formation of the first recording data sequence and formation of the second recording data sequence are performed so that, when laser light is applied onto the first recording data sequence and the second recording data sequence, the minimum level of reproduction signal amplitude in the first recording data sequence and the minimum level of reproduction signal amplitude in the second recording data sequence are substantially equal and the middle level of reproduction signal amplitude corresponding to the shortest pit or space in the first recording data sequence and the middle level of reproduction signal amplitude corresponding to the shortest mark or space in the second data sequence are substantially equal.

10. The manufacturing method for a read-only optical disc medium according to claim 9, wherein an information data modulation method in forming the first recording data sequence and an information data modulation method in forming the second recording data sequence are the same.

11. The manufacturing method for a read-only optical disc medium according to claim 9, wherein, in the forming the second recording data sequence, the minimum level of reproduction signal amplitude in the first recording data sequence and the minimum level of reproduction signal amplitude in the second recording data sequence are adjusted to be substantially equal and the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the marks formed by erasing or reducing the reflective film.

12. The manufacturing method for a read-only optical disc medium according to claim 9, wherein, in the shaping process, the minimum level of reproduction signal amplitude in the first recording data sequence and the minimum level of reproduction signal amplitude in the second data sequence are adjusted to be substantially equal and the middle level of reproduction signal amplitude corresponding to the shortest pit or space in the first recording data sequence and the middle level of reproduction signal amplitude corresponding to the shortest mark or space in the second recording data sequence are adjusted to be substantially equal by adjusting the width and/or length of the pits.

13. A read-only optical disc medium comprising:
    an information recording surface having a concavo-convex shape formed according to a first modulation signal; and
    a reflective film for covering the information recording surface,
    wherein a recording track is provided so that the concavo-convex shape is a first recording data sequence formed by pits and lands,
    wherein an additional-information recording area in which the information recording surface is flat is provided on the information recording surface and in the recording track in which the first recording data sequence is formed by the pits and the lands,
    wherein a second recording data sequence formed by marks obtained by erasing or reducing the reflective film according to a second modulation signal is provided in the additional-information recording area on the information recording surface, and
    wherein, when laser light is applied onto the first recording data sequence and the second recording data sequence, the minimum level of reproduction signal amplitude in the first recording data sequence and the minimum level of reproduction signal amplitude in the second recording data sequence are substantially equal.

14. A read-only optical disc medium comprising:
    an information recording surface having a concavo-convex shape formed according to a first modulation signal; and
    a reflective film for covering the information recording surface,
    wherein a recording track is provided so that the concavo-convex shape is a first recording data sequence formed by pits and lands,
    wherein an additional-information recording area in which the information recording surface is flat is provided on the information recording surface and in the recording track in which the first recording data sequence is formed by the pits and the lands,
    wherein a second recording data sequence formed by marks obtained by erasing or reducing the reflective film according to a second modulation signal is provided in the additional-information recording area on the information recording surface, and wherein, when laser light is applied onto the first recording data sequence and the second recording data sequence, the middle level of reproduction signal amplitude corresponding to the shortest pit or space in the first recording data sequence and the middle level of reproduction signal amplitude corresponding to the shortest mark or space in the second recording data sequence are substantially equal.

15. A read-only optical disc medium comprising:
an information recording surface having a concavo-convex shape formed according to a first modulation signal; and
a reflective film for covering the information recording surface,
wherein a recording track is provided so that the concavo-convex shape is a first recording data sequence formed by pits and lands,
wherein an additional-information recording area in which the information recording surface is flat is provided on the information recording surface in the recording track in which the first recording data sequence is formed by the pits and the lands,
wherein a second recording data sequence is formed by marks obtained by erasing or reducing the reflective film according to a second modulation signal, in the additional-information recording area on the information recording surface, and
wherein, when laser light is applied onto the first recording data sequence and the second recording data sequence, the minimum level of reproduction signal amplitude in the first recording data sequence and the minimum level of reproduction signal amplitude in the second recording data sequence are substantially equal, and the middle level of reproduction signal amplitude corresponding to the shortest pit or space in the first recording data sequence and the middle level of reproduction signal amplitude corresponding to the shortest mark or space in the second recording data sequence are substantially equal.

* * * * *